United States Patent
Kuo et al.

(10) Patent No.: US 9,516,286 B2
(45) Date of Patent: Dec. 6, 2016

(54) COLOR CORRECTION DEVICES AND METHODS

(71) Applicant: VisEra Technologies Company Limited, Hsin-Chu (TW)

(72) Inventors: Wu-Cheng Kuo, Hsin-Chu (TW); Yu-Kun Hsiao, Hsin-Chu (TW); Chung-Hao Lin, Keelung (TW)

(73) Assignee: VisEra Technologies Company Limited, Hsin-Chu (TW)

( * ) Notice: Subject to any disclaimer, the term of this patent is extended or adjusted under 35 U.S.C. 154(b) by 258 days.

(21) Appl. No.: 14/245,349

(22) Filed: Apr. 4, 2014

(65) Prior Publication Data
US 2015/0288939 A1 Oct. 8, 2015

(51) Int. Cl.
H04N 9/45 (2006.01)
H04N 9/04 (2006.01)
H04N 5/217 (2011.01)
H04N 5/357 (2011.01)

(52) U.S. Cl.
CPC .............. *H04N 9/045* (2013.01); *H04N 5/217* (2013.01); *H04N 5/357* (2013.01)

(58) Field of Classification Search
CPC ........ H04N 9/735; H04N 9/045; H04N 5/217; H04N 5/357
See application file for complete search history.

(56) References Cited

U.S. PATENT DOCUMENTS

| 8,823,841 B2 * | 9/2014 | Liu ........................ H04N 9/045 348/218.1 |
| 2004/0119860 A1 | 6/2004 | Vogel et al. |
| 2006/0087590 A1 | 4/2006 | Yang et al. |

(Continued)

FOREIGN PATENT DOCUMENTS

| CN | 1973553 A | 5/2007 |
| CN | 101242476 A | 8/2008 |

(Continued)

OTHER PUBLICATIONS

Office Action from the corresponding Taiwanese application mailed on Oct. 23, 2015, 5 pages.

(Continued)

*Primary Examiner* — Twyler Haskins
*Assistant Examiner* — Padma Haliyur
(74) *Attorney, Agent, or Firm* — Muncy, Geissler, Olds & Lowe, P.C.

(57) ABSTRACT

A color correction device for an image sensor is provided. The image sensor is divided into regions. The color correction device includes a quantum efficiency (QE) measurement circuit, an addressing circuit, and a correction circuit. The QE measurement circuit generates a color signal according to a sensing signal from each pixel of the image sensor. The addressing circuit receives the color signal corresponding to each pixel, obtains a location of each pixel on the image sensor, and averages all of the color signals corresponding to the pixels whose locations are disposed in one of the regions to obtain an average color signal. The correction circuit receives the average color signal to obtain a color correction matrix of the one of the regions and corrects the color signals of the pixels whose locations are in the one of the regions by the color correction matrix.

14 Claims, 10 Drawing Sheets

(56) References Cited

U.S. PATENT DOCUMENTS

2007/0065006 A1   3/2007   Wilensky
2013/0093915 A1   4/2013   Zhang et al.

FOREIGN PATENT DOCUMENTS

CN    102045575 A    5/2011
CN    102244790 A    11/2011
JP    2007 129622    5/2007

OTHER PUBLICATIONS

Office Action from the corresponding Japanese application mailed on Sep. 24, 2015, 6 pages.
Chinese Office Action and its search report corresponding to CN application No. 201410290598.2 dated Aug. 5, 2016; pp. 1-8.

* cited by examiner

COLOR CORRECTION DEVICES AND METHODS

BACKGROUND OF THE INVENTION

Field of the Invention

The invention relates to a color correction device, and more particularly to a color correction device which obtains a color correction matrix according to locations of pixels.

Description of the Related Art

An image sensor is used to detect light from a light source by a pixel array and then convert the detected light to electrical signals. Typically, an image sensor requires a color correction matrix to correct color perception errors represented in electrical signals. However, the color correction matrix is adopted for one specific light source. When the image sensor moves to a different space, the image sensor may be illuminated by a different light source. At this time, the color correction matrix for the one specific light source is not used anymore. Thus, in a conventional image sensor, several color correction matrices are predetermined for different light sources. As described above, the conventional image sensors all select and adopt a color correction matrix based on the type of the light source. In fact, for an image sensor, color perception errors may be different due to different locations of pixels on a pixel array. Even though the image sensor is still illuminated by the same light source, electrical signals from the pixels disposed on the different locations may require different correction parameters, such as different color correction matrices. The above conventional image sensors do not consider this issue.

BRIEF SUMMARY OF THE INVENTION

Thus, it is desirable to provide a color correction device which can obtain and adopt a color correction matrix according to locations of pixels.

An exemplary embodiment of a color correction device for an image sensor is provided. The image sensor is divided into a plurality of regions. The color correction device comprises a quantum efficiency (QE) measurement circuit, an addressing circuit, and a correction circuit. The QE measurement circuit generates a color signal according to a sensing signal from each of a plurality of pixels of the image sensor. The addressing circuit receives the color signal corresponding to each pixel, obtains a location of each pixel on the image sensor, and averages all of the color signals corresponding to the pixels whose locations are disposed in one of the regions to obtain an average color signal. The correction circuit receives the average color signal to obtain a color correction matrix of the one of the regions and corrects the color signals of the pixels whose locations are in the one of the regions by the color correction matrix.

An exemplary embodiment of a color correction method for an image sensor is provided. The image sensor is divided into a plurality of regions. The color correction method comprises the step of receiving a sensing signal from each of a plurality of pixels of the image sensor; generating a color signal according to the received sensing signal of each pixel; obtaining a location of each pixel on the image sensor; averaging all of the color signals of the pixels whose locations are disposed in one of the regions to obtain an average color signal; obtaining a color correction matrix of the one of the regions according to the average color signal; and correcting the color signals of the pixels whose locations are in the one of the regions by the color correction matrix.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
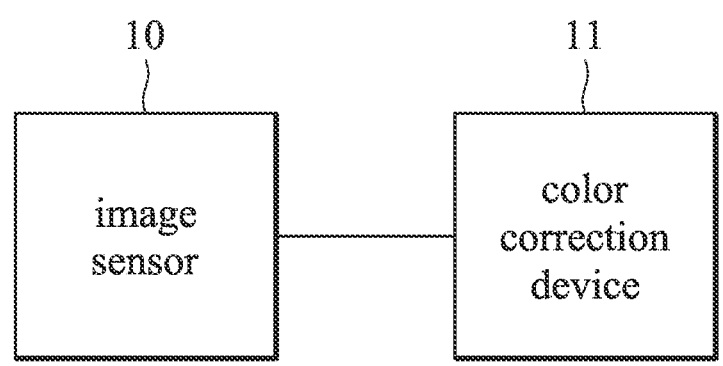
FIG. 1 shows an exemplary embodiment of an image sense device.
Figure 2:
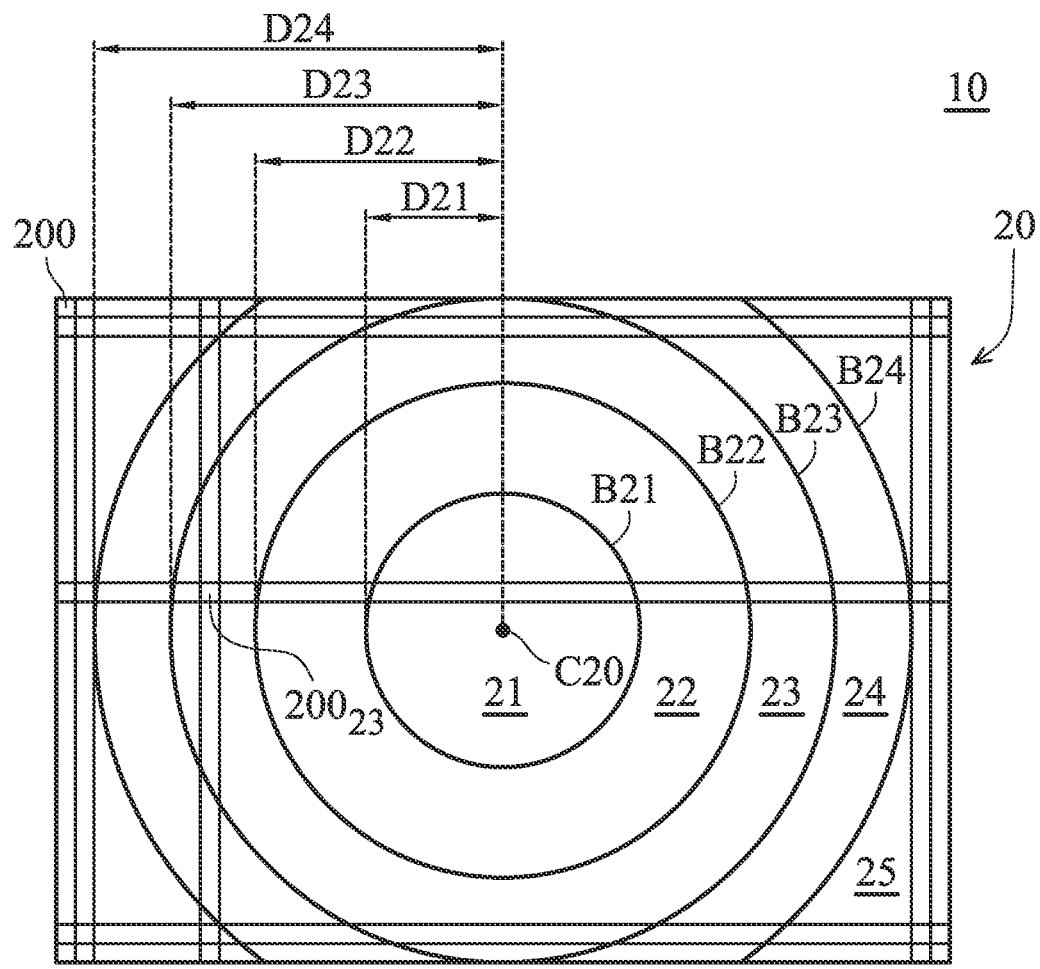
FIG. 2 shows one exemplary embodiment of an image sensor in FIG. 1.

FIG. 1 shows an exemplary embodiment of an image sense device. As shown in FIG. 1, an image sense device 1 comprises an image sensor 10 and a color correction device 11. The image sense device 1 can receive light through the image sensor 10 and generate electrical color signals according to the detected light. An image can be shown in a displayer according to the electrical color signals. FIG. 2 shows one exemplary embodiment of the image sensor 10. As shown in FIG. 2, the image sensor 10 comprises a plurality of pixels 200 arranged in a pixel array 20. In FIG. 2, the pixel array 20 is represented by several vertical lines and several horizontal lines which are interlaced with the vertical lines, One set of the interlaced vertical line and horizontal line defines one pixel 200. For clearly showing drawings, FIG. 2 only shows six vertical lines and six horizontal lines, and two pixels 200 and $200_{23}$ are marked in FIG. 2. The pixel array 20 of the image sensor 10 is divided into a plurality of regions of interest (ROIs). In the embodiment of FIG. 2, the center C20 of the image sensor 10 is defined. The pixel array 20 of the image sensor 10 is divided into five ROIs 21-25 according to five ranges of the distance from the center C20. Accordingly, the pixels 200 in the pixel array 20 are disposed in the five ROIs respectively. Referring to FIG. 2, the ROI 21 is defined by a boundary B21, and any point on the boundary B21 is apart from the center C20 by a distance D21. The distance between any one pixel in the ROI 21 and the center C20 is shorter than the distance D21. The ROI 22 is defined by the boundary B21 and a boundary B22, and any point on the boundary B22 is apart from the center C20 by a distance D22. The distance between any one pixel in the ROI 22 and the center C20 is longer than the distance D21 and shorter than the distance D22. The ROI 23 is defined by the boundary B22 and a boundary B23, and any point on the boundary B23 is apart from the center C20 by a distance D23. The distance between any one pixel in the ROI 23 and the center C20 is longer than the distance D22 and shorter than the distance D23. The ROI 24 is defined by the boundary B23 and a boundary B24, and any point on the boundary B24 is apart from the center C20 by a distance D24. The distance between any one pixel in the ROI 24 and the center C20 is longer than the distance D23 and shorter than the distance D24. Moreover, the remaining area in the image array 20 is defined as the ROI 25. There are the pixels disposed outside of the ROIs 21-24 in the ROI 25, and the distance between any one pixel in the ROI 25 and the center C20 is larger than the distance D24.

Figure 3:
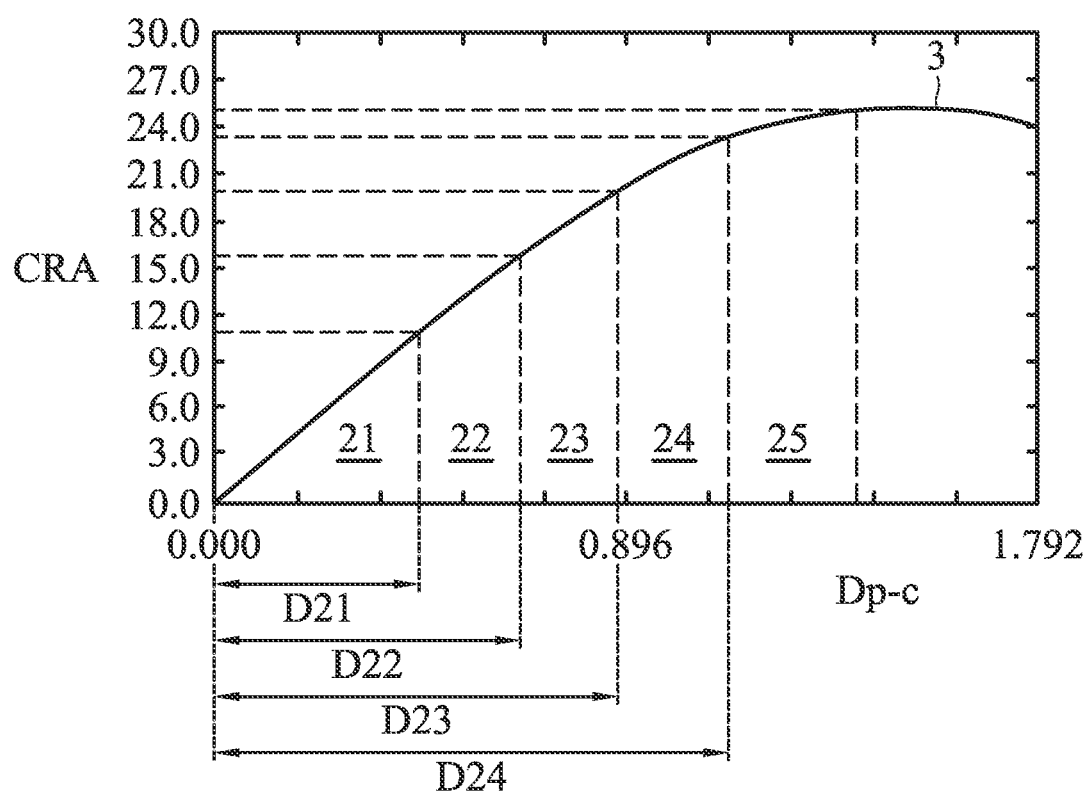
FIG. 3 shows a chief ray angle (CRA) curve for a pixel array based on a division pattern of FIG. 2.

FIG. 3 shows a module lens chief ray angle (CRA) curve 3 for the pixel array 20 of the image sensor 10 based on the division pattern of FIG. 2. Referring to FIG. 3, the X axis represents the distance Dp-c between any point in the pixel array 20 and the center C20, and the Y axis represents the chief ray angle CRA when the image sensor 10 is being illuminated by a light source. According to the CRA curve 3, the different distances from the center C20 correspond to different values of the chief ray angle CRA. In order to describe the embodiment clearly, FIG. 3 also shows the relationship between the chief ray angle CRA and the ROIs 21-25 through dotted lines with the reference signs D21-D24 of the distances and 21-25 of the ROIs.

Figure 4:
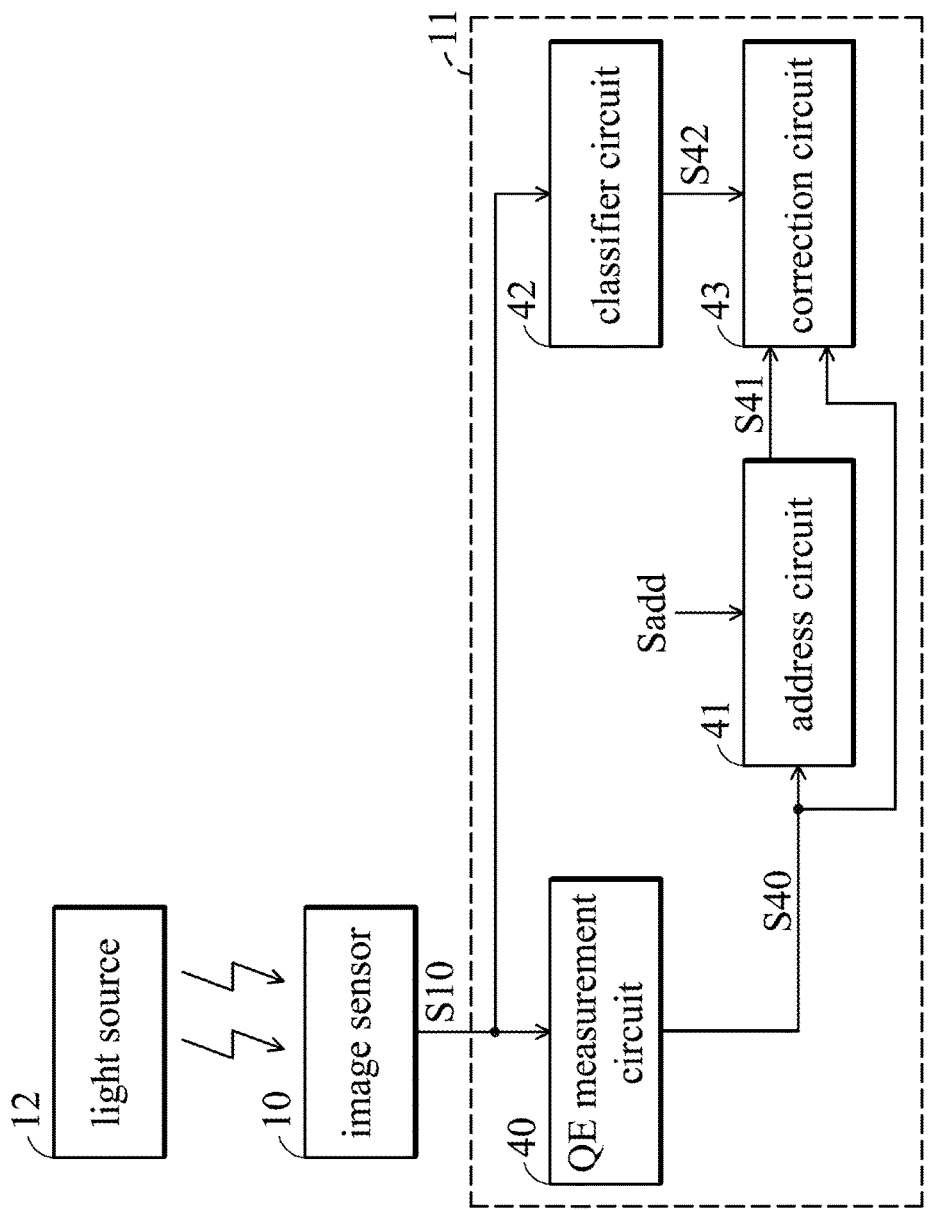
FIG. 4 shows one exemplary embodiment of a color correction device.

FIG. 4 shows one exemplary embodiment of the color correction device 11. As shown in FIG. 4, the color correction device 11 comprises a quantum efficiency (QE) measurement circuit 40, an addressing circuit 41, a classifier circuit 42, and a correction circuit 43. In order to illustrate the operation of the color correction device 11, FIG. 4 also shows the image sensor 10. Referring to FIGS. 2 and 4, when the image sensor 10 is being illuminated by a light source 12, each of the pixels 200 of the pixel array 20 generates a corresponding sensing signal S10. Then, a color correction process begins. In the color correction process, the QE measurement circuit 40 receives the sensing signal S10 from each pixel 200 and generates a corresponding color signal S40 according to the received sensing signal S10. In one embodiment, the QE measurement circuit 40 is used to detect the QE spectrum of the image sensor 10. For example, the QE measurement circuit 40 can measure the number of photons entering one pixel 200 and the number of electrons in the corresponding sensing signal S10 from the same pixel 200 and generate a corresponding color signal S40 in response to the measurement result. The addressing circuit 41 receives the color signal S40 corresponding to each pixel 200. The addressing circuit 41 further receives an address signal Sadd which represents the address information of the pixels 200 on the pixel array 20. Accordingly, the addressing circuit 41 can obtain the location of each pixel 200 on the pixel array 20 according to the address signal Sadd. The addressing circuit 41 obtains the information of the division pattern of the pixel array 20 in advance. When obtaining the location of one of the pixels 200, the addressing circuit 41 begins to calculate the distance between the same pixel 200 and the center C20 and determines the ROI where the same pixel 200 is disposed according to the calculated distance. In another embodiment, the addressing circuit 41 can determine the ROI where the same pixel 200 is disposed according to the calculated distance and the coordinates of the same pixel 200. Then, the addressing circuit 41 records the received color signal S40 and the obtained location of each pixel 200. For example, when the distance between the pixel $200_{23}$ and the center C20, calculated by the addressing circuit 41, is longer than the distance D22 and shorter than the distance D23, the addressing circuit 41 determines the ROI 23 wherein the pixel $200_{23}$ is disposed. After the addressing circuit 41 receives the corresponding color signal S40 and obtains the location of the pixel $200_{23}$, the addressing circuit 41 records the received color signal S40 and the obtained location of the pixel $200_{23}$ in a register or a memory.

When the color correction process begins in a while, the addressing circuit 41 begins to check whether all of the color signals S40 of the pixels 200 whose locations are disposed in one of the ROIs 21-25 have been recorded. For example, the addressing circuit 41 checks whether all of the color signals S40 of the pixels 200 whose locations are disposed in the ROI 23 have been recorded. When the addressing circuit 41 checks that the color signals S40 of the pixels 200 in the ROI 23 have been recorded, the addressing circuit 41 averages the color signals S40 of the pixels 200 in the ROI 23 to obtain an average color signal S41. Moreover, the addressing circuit 41 can also perform the above check and average operations for at least one of the other ROIs 21-22 and 24-25 to obtain a corresponding average color signal S41.

Referring to FIG. 4, the classifier circuit 42 also receives the sensing signals S10 of the pixels 200. The classifier circuit 42 determines what type of the light source 12 according to the received sensing signal S10 and generates an ideal color information signal S42 according to the determination result of the light source 12. In the embodiment, the ideal color information signal S42 represents an ideal color patch spectrum. After the average color signal S41 of the ROI 23 and the ideal color information signal S42 are obtained, the correction circuit 43 receives the average color signal S41 of the ROI 23 and the ideal color information signal S42 and then obtains a color correction matrix of the ROI 23 according to the average color signal S41 of the ROI 23 and the ideal color information signal S42.

Figure 5:
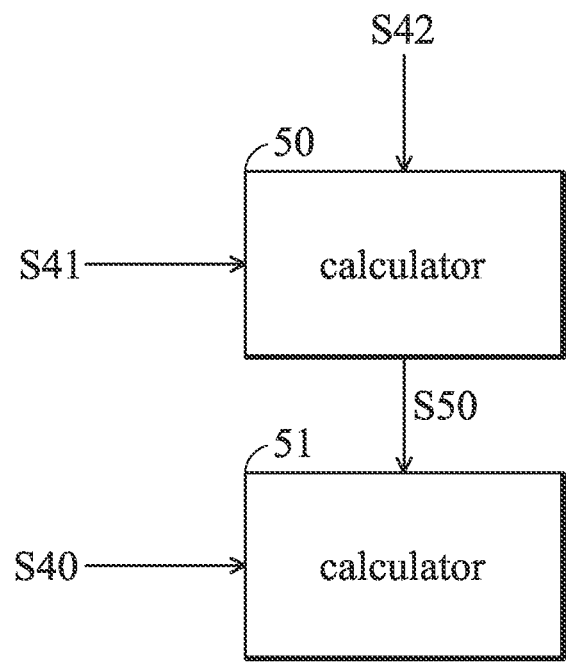
FIG. 5 shows one exemplary embodiment of a correction circuit of the color correction in FIG. 4.

FIG. 5 shows one exemplary embodiment of the correction circuit 43. As shown in FIG. 5, the correction circuit 43 comprises a calculator 50 and a calculator 51. The calculator 50 receives the average color signal S41 of the ROI 23 and the ideal color information signal S42 and calculates a corresponding color correction matrix S50 of the ROI 23 according to the difference between the average color signal S41 of the ROI 23 and the ideal color information signal S42. The calculator 51 receives the calculated color correction matrix S50 of the ROI 23 and also receives the color signals S40 of the pixels 200 in the ROI 23. Then, the calculator 51 corrects the color signals S40 of the pixels 200 in the ROI 23 by the calculated color correction matrix S50.

Figure 6:
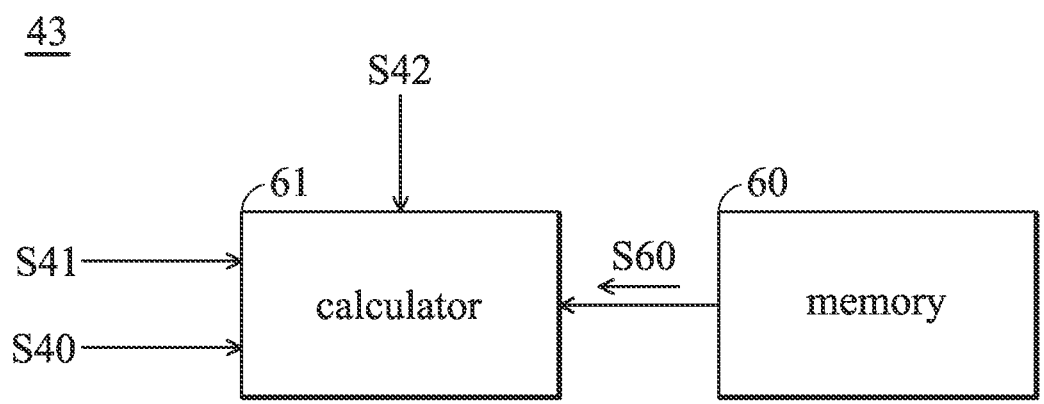
FIG. 6 shows another exemplary embodiment of a correction circuit of the color correction in FIG. 4.

FIG. 6 shows another exemplary embodiment of the correction circuit 43. Referring to FIG. 6, the correction circuit 43 comprises a memory 60 and a calculator 61. The memory 60 stores a plurality of color correction reference matrices. The calculator 61 receives the average color signal S41 of the ROI 23 and the ideal color information signal S42 and reads a corresponding color correction reference matrix from the memory 60 according to the difference between the average color signal S41 of the ROI 23 and the ideal color information signal S42 to serve as a color correction matrix S60 of the ROI 23. After the calculator 61 obtains the color correction matrix S60, the calculator 61 corrects the color signals S40 of the pixels 200 in the ROI 23 by the calculated color correction matrix S60.

In the embodiments of FIGS. 5 and 6, the ROI 23 is given as an example to explain the correction of the color signal S40 of the pixels 200 in the ROI 23. However, the color signal S40 of the pixels 200 in each of the other ROIs 21-22 and 24-25 can be also corrected by the correction operation of the correction circuit in FIG. 5 or 6. Due to it being the same correction operation, the related description is omitted here.

Figure 7:
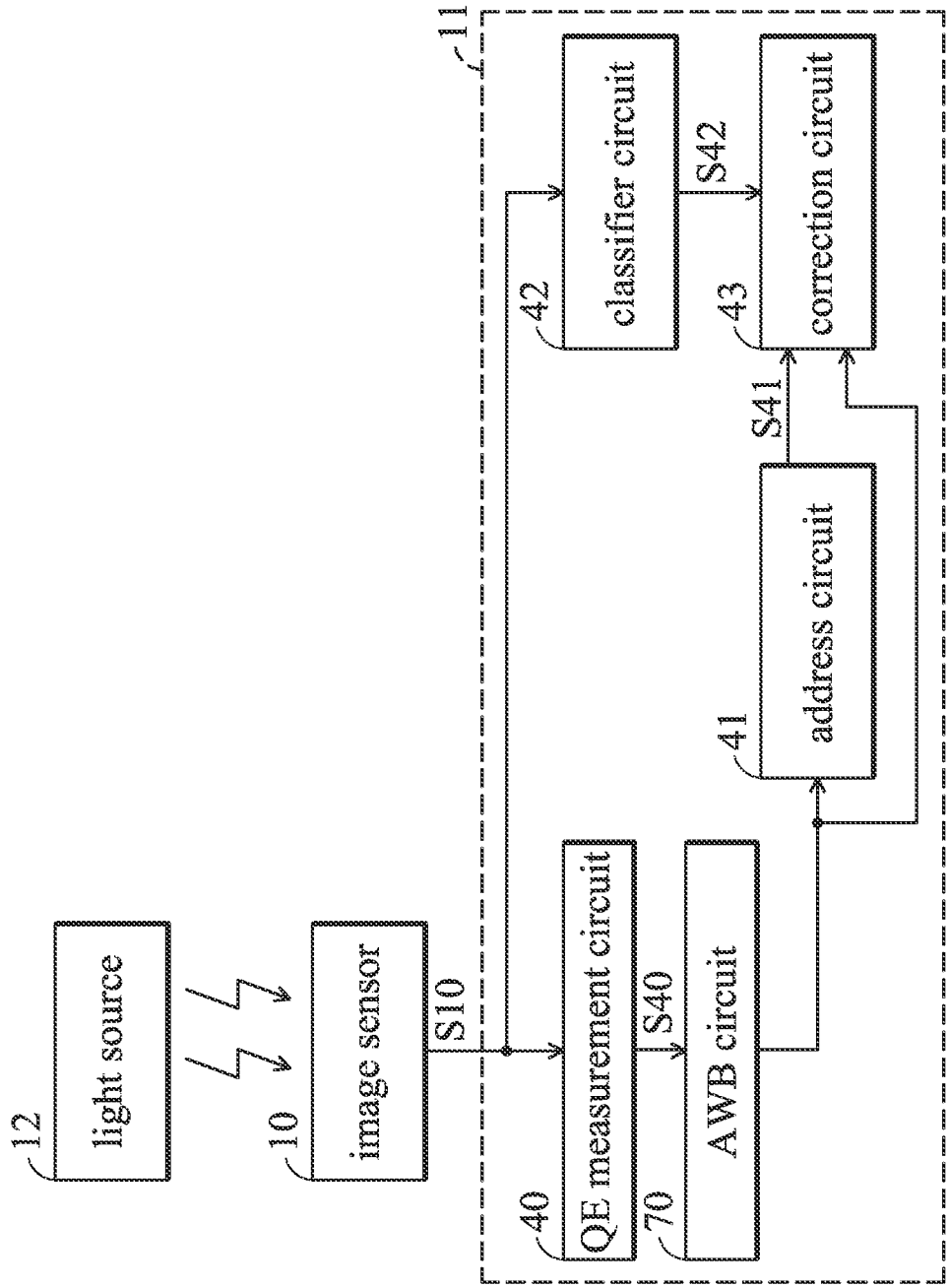
FIG. 7 shows another exemplary embodiment of a color correction device.

In another embodiment, the color correction device 11 further comprises an auto white balance (AWB) circuit 70, as shown in FIG. 7. Referring to FIG. 7, the AWB circuit 70 is coupled between the QE measurement circuit 40 and the addressing circuit 41. The AWB circuit 70 receives the color signal S40 of each pixel 200 and performs a white balance operation to the received color signal S40. The color signal S40 of each pixel 200, which is processed by the AWB circuit 70, is transmitted to the addressing circuit 41.

According to the above embodiments, the determination of the color correction matrices is performed according to the locations of the pixels 200, such as the ROIs 21-25 of the image sensor 10. Thus, the color signals S40 of the pixels 40 disposed on the different locations may be corrected appropriately. The quality the image generated according to the corrected color signals signal S40 is enhanced.

Figure 8:
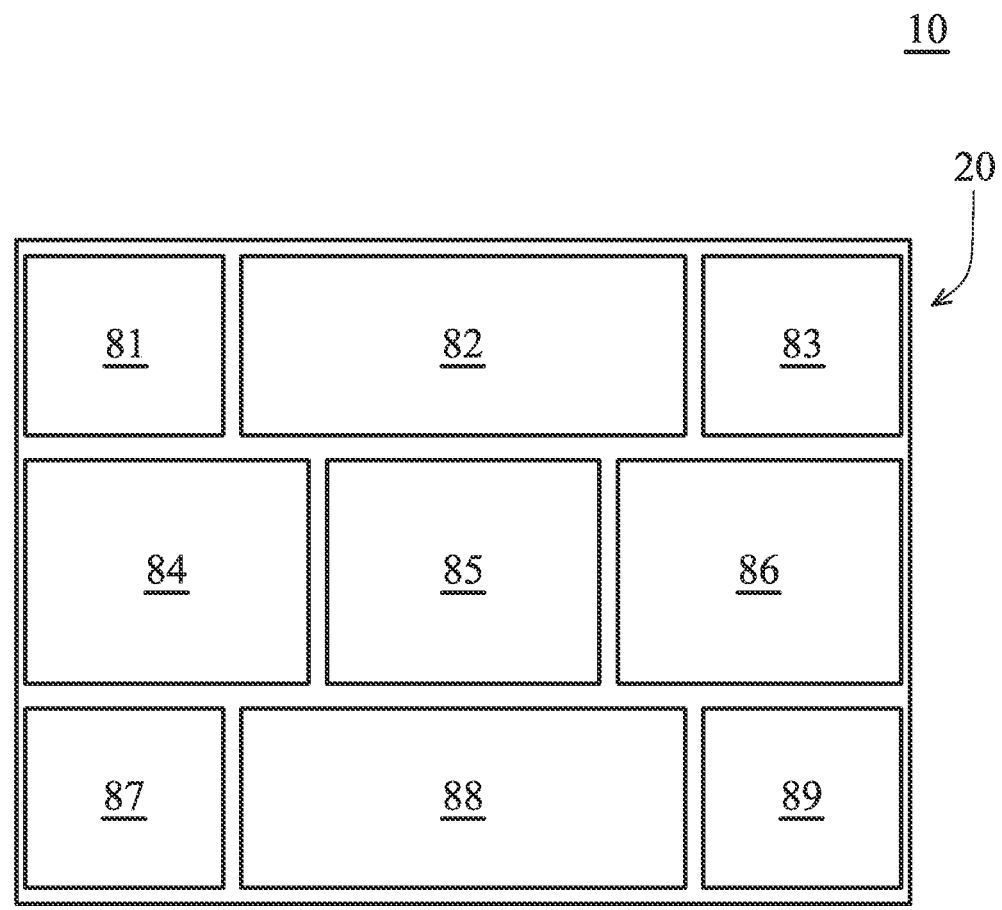
FIG. 8 shows another exemplary embodiment of an image sensor in FIG. 1.

In the above embodiment of FIG. 2, the pixel array 20 of the image sensor 10 is divided into the five ROIs 21-25 according to five ranges of the distance from the center C20. However, in other embodiments, the pixel array 20 of the image sensor 10 may be divided into several ROIs based other patterns. FIG. 8 shows another exemplary embodiment of the image sensor 10. As shown in FIG. 8, the pixel array 20 of the image sensor 10 is divided into nine ROIs 81-89 based nine rectangles. The addressing circuit 41 obtains the information of the division pattern of the pixel array 20 in advance, such that the addressing circuit 41 can determine the ROI where one pixel 200 is disposed according to the addressing signal Sadd.

Figure 9:
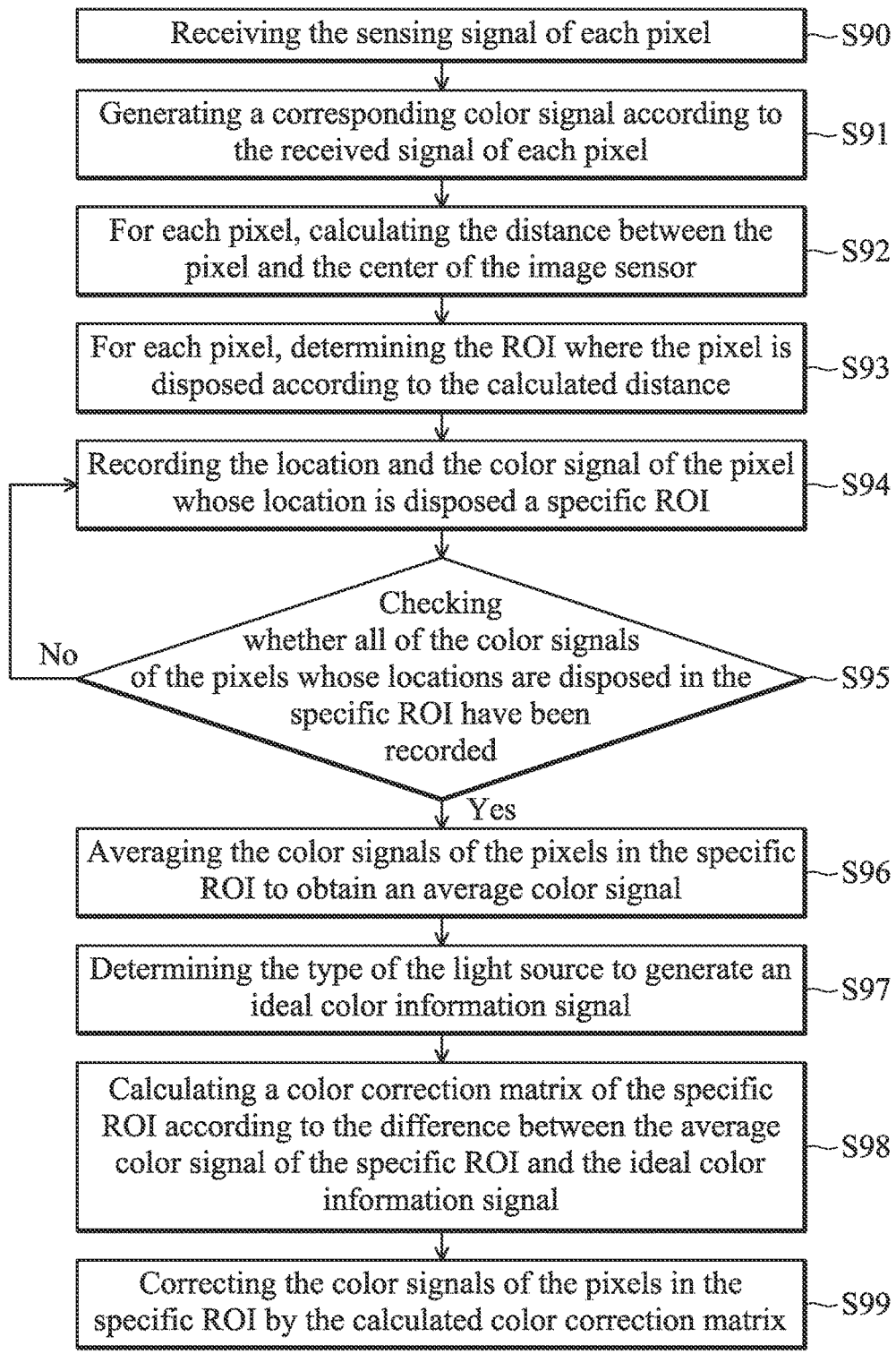
FIG. 9 is a flow chart of one exemplary embodiment of a color correction method for an image sensor.

FIG. 9 is a flow chart of one exemplary embodiment of a color correction method for an image sensor. In the following, for example, the color correction method is applied for the image sensor 10 of FIG. 4. The color correction method will be described by applying referring to FIGS. 2, 4, and 9. The image sensor 10 is illuminated by the light source 12, and each pixel 200 of the image sensor 10 generates a sensing signal S10. First, the QE measurement circuit 40 receives the sensing signal S10 of each pixel 200 (Step S90) and then generates a corresponding color signal S40 according to the received signal of each pixel 200 (Step S91). Then, the location of each pixel 200 on the image sensor 10 is obtained. In an embodiment, for each pixel 200, the addressing circuit 41 calculates the distance between the pixel 200 and the center C20 (Step S92) and determines the ROI where the same pixel 200 is disposed according to the calculated distance (Step S93).

Then, the addressing circuit 41 records the location and the color signal S40 of the pixel 200 whose location is disposed in a specific ROI (Step S94) and checks whether all of the color signals S40 of the pixels 200 whose locations are disposed in the specific ROI have been recorded (Step S95). When the addressing circuit 41 checks that all of the color signals S40 of the pixels 200 whose locations are disposed in the specific ROI have not been recorded, the color correction method proceeds back to step S94. When the addressing circuit 41 checks that the color signals S40 of the pixels 200 in the specific ROI have been recorded, the addressing circuit 41 averages the color signals S40 of the pixels 200 in the specific ROI to obtain an average color signal S41 (Step 96). Moreover, the addressing circuit 41 can also perform the above step S94-S96 for at least one of the other ROIs to obtain a corresponding average color signal S41.

At any one time point during the performance of steps S90-S96, the classifier circuit 42 determines the type of the light source 12 and generates an ideal color information signal S42 according to the determination result of the light source 12 (Step S97). After the average color signal S41 of the specific ROI and the ideal color information signal S42 are obtained, the correction circuit 43 calculates a color correction matrix of the specific ROI according to the difference between the average color signal S41 of the specific ROI and the ideal color information signal S42 (Step S98). Then, the correction circuit 43 corrects the color signals S40 of the pixels 00 in the specific ROI by the calculated color correction matrix (Step S99). According to the above description, step S97 can be performed at any time only before step S98 is performed.

Figure 10:
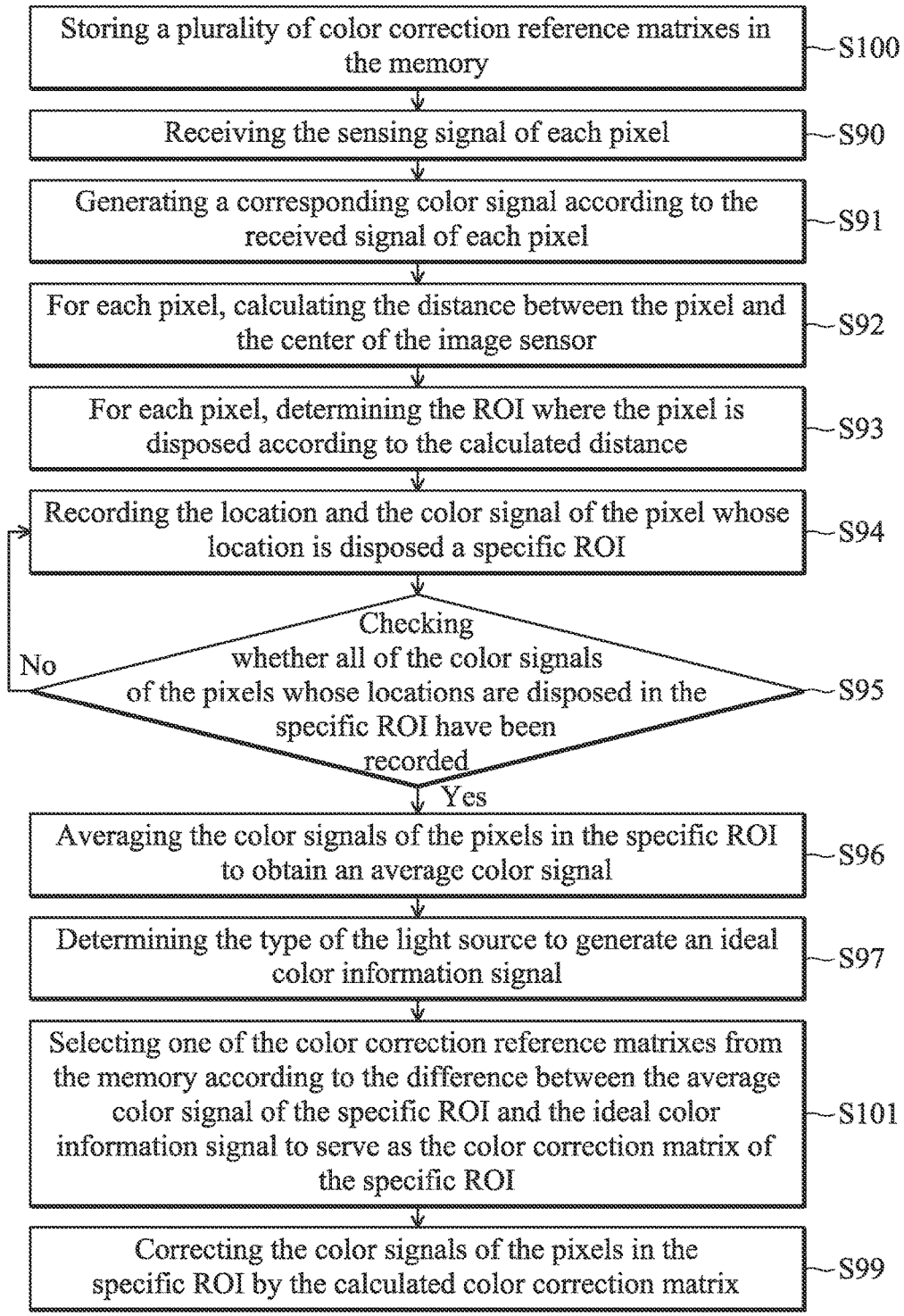
FIG. 10 is a flow chart of another exemplary embodiment of a color correction method for an image sensor.

FIG. 10 is a flow chart of another exemplary embodiment of a color correction method for an image sensor. The steps of the embodiment in FIG. 10 are also the same as the steps of the embodiment in FIG. 9. However, there are additional Step S100 and Step S101, wherein Step 101 is used to replace Step S97. In step S100, a plurality of color correction reference matrices are stored in the memory 60. In step S101, the correction circuit 43 selects one of the color correction reference matrices from the memory 60 according to the difference between the average color signal S41 of the specific ROI and the ideal color information signal S42 to serve as the color correction matrix of the specific ROI. In the embodiment of FIG. 10, step S100 is performed before step S90, however, without limiting the invention. In other embodiments, step S100 can be performed any time point before step S101 is performed.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A color correction device for an image sensor which is divided into a plurality of regions, comprising:
   a quantum efficiency measurement circuit generating a color signal according to a sensing signal from each of a plurality of pixels of the image sensor;
   an addressing circuit receiving the color signal corresponding to each pixel, obtaining a location of each pixel on the image sensor, and averaging all of the color signals corresponding to the pixels whose locations are disposed in one of the regions to obtain an average color signal;
   a correction circuit receiving the average color signal to obtain a color correction matrix of the one of the regions and correcting the color signals of the pixels whose locations are in the one of the regions by the color correction matrix; and
   a classifier circuit receiving the sensing signal corresponding to each pixel to determine a type of a light source which is illuminating the image source and generating an ideal color information signal according to a result of determining the type of the light source.

2. The color correction device as claimed in claim 1, wherein, for each pixel, the addressing circuit calculates a distance between the each pixel and a center of the image sensor and determines the region where the each pixel is disposed according to the calculated distance.

3. The color correction device as claimed in claim 1, wherein, for each pixel disposed in one of the regions, the addressing circuit records the location and the color signal of the each pixel whose location is disposed in the one region and checks whether all of the color signals of the pixels whose locations are disposed in the one region have been recorded.

4. The color correction device as claimed in claim 3, wherein when the addressing circuit checks that all of the color signals of the pixels whose locations are disposed in the one region have been recorded, the addressing circuit averages the color signals corresponding to the one region to obtain the average color signal.

5. The color correction device as claimed in claim 1, wherein the correction circuit receives the ideal color information signal and the average color signal of each region and then calculates the color correction matrix of the one of the regions according to the ideal color information signal and the average color signal.

6. The color correction device as claimed in claim 1, wherein the correction circuit comprises:
a first calculator receiving the average color signal and an ideal color information signal and calculating the color correction matrix of the one of the regions according to the difference between the average color signal and the ideal color information signal; and
a second calculator receiving the color correction matrix of the one of the regions and correcting the color signals of the pixels whose locations are in the one of the regions by the color correction matrix.

7. The color correction device as claimed in claim 1, wherein the correction circuit comprises:
a memory storing a plurality of color correction reference matrixes;
a calculator receiving the average color signal and an ideal color information signal, reading one of the color correction reference matrixes from the memory according to the difference between the average color signal and the ideal color information signal to serve as the color correction matrix of the one of the regions, and correcting the color signals of the pixels whose locations are in the one of the regions by the color correction matrix.

8. A color correction method for an image sensor which is divided into a plurality of regions, comprising:
receiving a sensing signal from each of a plurality of pixels of the image sensor;
generating a color signal according to the received sensing signal corresponding to each pixel;
obtaining a location of each pixel on the image sensor;
averaging all of the color signals corresponding to the pixels whose locations are disposed in one of the regions to obtain an average color signal;
obtaining a color correction matrix of the one of the regions according to the average color signal;
correcting the color signals of the pixels whose locations are in the one of the regions by the color correction matrix;
determining a type of a light source which is illuminating the image source; and
generating an ideal color information signal according to a determination result.

9. The color correction method as claimed in claim 8, wherein the step of obtaining the location of each pixel on the image sensor comprises:
for one pixel, calculating a distance between the each pixel and a center of the image sensor; and
determining the regions where the each pixel is disposed according to the calculated distance.

10. The color correction method as claimed in claim 8 further comprising:
for each pixel in one of the regions, recording the location and the color signal of the each pixel whose location is disposed in the one of the one regions; and
checking whether all of the color signals of the pixels whose locations are disposed in the one regions have been recorded.

11. The color correction method as claimed in claim 10, wherein when all of the color signals of the pixels whose locations are disposed in the one region have been recorded, the color signals corresponding to the one region is averaged to obtain the average color signal.

12. The color correction method as claimed in claim 8, wherein the step of obtaining the color correction matrix comprises:
obtaining the color correction matrix of the one of the regions according to the ideal color information signal and the average color signal.

13. The color correction method as claimed in claim 8, wherein the step of obtaining the color correction matrix comprises:
calculating the color correction matrix of the one of the regions according to the difference between the average color signal and an ideal color information signal.

14. The color correction method as claimed in claim 8 further comprising:
storing a plurality of color correction reference matrices;
wherein the step of obtaining the color correction matrix comprises:
selecting one of the color correction reference matrices according to the difference between the average color signal and an ideal color information signal to serve as the color correction matrix of the one of the regions.

* * * * *